June 8, 1937.  A. BALABAN  2,083,215
PHOTOGRAPHIC DIFFUSING DEVICE FOR ENLARGING AND PROJECTION PRINTING
Filed Nov. 16, 1935
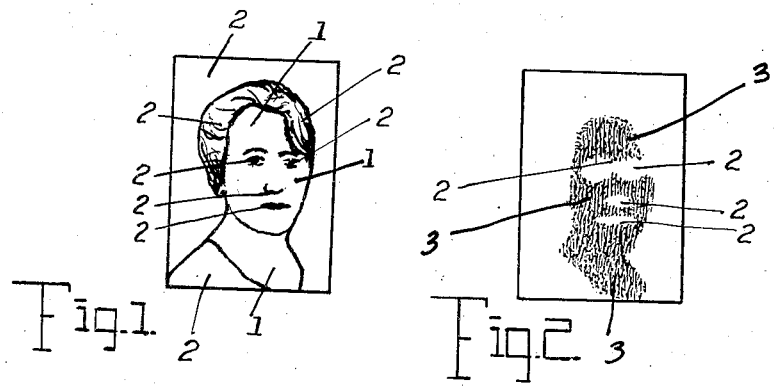
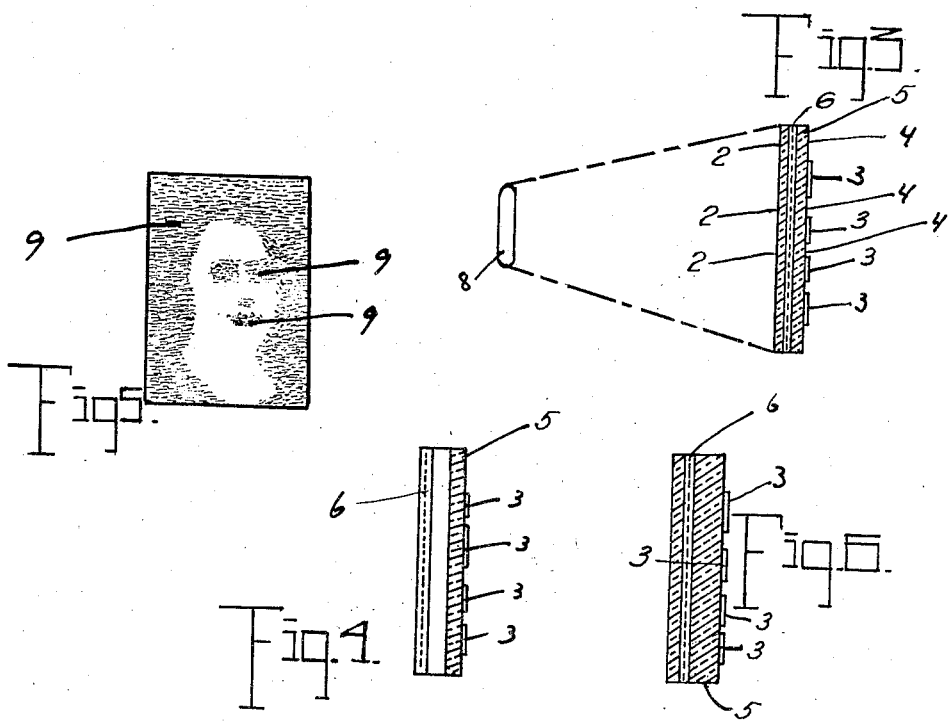
INVENTOR.
Alexander Balaban Patented June 8, 1937

2,083,215

UNITED STATES PATENT OFFICE 2,083,215

PHOTOGRAPHIC DIFFUSING DEVICE FOR ENLARGING AND PROJECTION PRINTING

Alexander Balaban, New York, N. Y.

Application November 16, 1935, Serial No. 50,107

4 Claims. (Cl. 95—5)

This invention relates to photographic diffusing, and more particularly, to a diffusing device or means employed in the making of enlargements of a negative or in the projection printing of a negative; and the object of the invention is to provide a means or method of diffusing, which is restricted to selected or desired areas of a negative, whereas, the remaining portions or areas of the negative may be transmitted onto the sensitized surface undiffused, retaining the latter areas in the original sharp state; a further object being to provide means for diffusing retouched parts or areas of a negative so as to render the retouchings substantially invisible in the resulting print; a further object being to provide a photographic reproducing process which will reduce the amount of retouching on the negative; a further object being to provide means whereby various intensities of diffusing may be effected, or provided on the diffused areas of the image; a still further object being to provide a method and means whereby sharpness of details and outlines of the resulting print made according to my invention will be harmoniously combined with the diffused areas of the same; and with these and other objects in view, the invention consists in a means of diffusing as more fully hereinafter described and claimed.

The invention is fully disclosed in the following specification, of which the accompanying drawing forms a part, in which the separate parts of my improvement are designated by suitable reference characters, and in which:

Fig. 1 is a diagrammatic face view giving a positive representation of a negative.

Fig. 2 is a face view of a diffusing mask illustrating predetermined diffused areas thereof.

Fig. 3 is a side elevation of both negative and diffusing mask placed in close contact in the negative holder, diagrammatically illustrating the use thereof.

Fig. 4 is a view similar to Fig. 3 showing a modified arrangement of the parts.

Fig. 5 is a face view of a modified form of diffusing plate or film which I may employ; and, Fig. 6 is a view similar to Fig. 3 showing another modification.

In photographic enlargement and projection printing, two rather important problems exist. One is that of producing photographs free from objectionable heavy lines effected by pencil strokes or other markings of the retoucher on the negative, while the other is that of an unimpaired transmission onto the sensitized surface, of all the sharpness which the negative possesses with respect to details and outline. While the work of retouching is a developed art, the art is markedly lacking in means for satisfactorily and effectively diffusing the retouched markings or other undesirable defects of a picture. In accordance with present methods, diffusing is uniformly spread over the entire area or field of the picture or image, with the result that delicate lines in the eyes, mouth, nose, hair, garment, etc., of a portrait, for example, are extremely dulled or lost, the result of which is that the photograph or print will have a hazy appearance throughout. As a rule, imperfections of the negative image, such as wrinkles, freckles, various lines and blemishes, are restricted to the skin areas and the elimination of these imperfections is the work of the retoucher. Usually, these imperfections appear on the forehead, cheeks, chin, neck and chest of a portrait. The traces of the retoucher's markings on the negative are what necessitates the use of a diffusing means. Yet, the remaining areas of the image, which require the attention of the retoucher only on rare occasions, and which are usually free from the retouch markings, are given the same diffusing as the retouched skin areas.

My invention obviates these defective and objectionable methods by providing means for selectively adjusting the diffusing or to localize or concentrate diffusing to restricted and limited areas of a picture. With my improved device and method, it is possible to pass or project at will and according to practical requirements, any portion or portions of the image on a film or negative onto the sensitized surface of a printing paper either diffused or with the original sharp areas of the image.

In carrying my invention into effect, I provide a diffusing element or member, preferably composed of transparent material like glass, film, etc., which I coat with some translucent substance; or, in lieu of translucent material, I may also use any translucent element, for example, ground glass and the like. In the latter case, I also use some substance whose effect is to convert translucency to transparency, or, if desired, I may change the light transmitting properties of such a material in a mechanical or chemical way. In coating or otherwise changing the transparent or diffusing element, the coated or converted areas should correspond to or register with the appropriate portions or areas of the negative image, especially when the element is arranged in close contact with the negative so as to provide the proper diffusing mask or screen for the predetermined skin areas, while the transparent portions of said element should correspond to the areas of the negative image which are not to be diffused.

Some of the preferred modifications of my invention are set forth and disclosed in these specifications and drawing, and they are included merely for purposes of illustration and not as limitations thereof. To the best of my knowledge and belief, I am the first to have provided a diffusing means or element that can be selectively adjusted so that only certain sections of the image may be diffused and without effecting other areas in the transfer of a print or enlargement of a picture or image onto a sensitized surface.

In Fig. 1 of the drawing, I have diagrammatically illustrated a positive representation of a negative, simply to indicate and distinguish the areas to be diffused from those which do not require diffusing. In said figure, the numerals 1 represent what I have referred to as the skin areas which include the forehead, cheeks, chin and neck, whereas at 2, I have indicated the eyes, nose, mouth, hair and background or outline of a portrait which are not to be diffused.

In Fig. 2 of the drawing, I have shown a film, glass or other masking or screening element of transparent material upon which the diffusing is applied as indicated by the numeral 3, which operation is performed by arranging the film or glass in close contact with the negative, and the operator then proceeds to apply the markings or coatings of the masking body upon said film or glass over and tracing the skin areas 1 without touching or interfering with the areas 2 which are left blank or transparent.

This masking operation may be performed by the use of a brush or other instrument and I have found that fats, oils, waxes, soaps and the like give very satisfactory, translucent effects in applying the diffusing screen to the glass or film. I prefer ordinary oil soap for the reason that it is readily removable in the reuse of the masking element employed, and further, from the standpoint that a minimum amount of light transmission is lost through this material or substance. The substance is spread by the operator on the glass, superimposing the skin areas in question.

In use, in the transmission of light from the source 8, Fig. 3, of an enlarging apparatus through the sections 1 of the negative, the projection passing through the diffusing screen will be diffused sufficiently to eliminate or soften the defects or markings of the retoucher which have been applied to the skin areas 1 in question to remove the wrinkles, blemishes or other defects in such skin areas, so that the resulting print will be substantially clear and without blemishes or markings on such skin areas.

In Fig. 3 of the drawing, the diffusing screen as represented by the numerals 3, has parts projecting from the surface of the glass 5 in order to diagrammatically illustrate their location; whereas, the remaining areas 4 of the glass or film remain transparent. In Fig. 3, a diagrammatic arrangement of the film and screen is shown with respect to the light 8 of the projector. In this figure, 6 represents the film or negative, whereas the plate or sheet between the film and the light 8 represents a supporting glass or other transparent body commonly employed in the frames for supporting the negative in a projecting apparatus.

In Fig. 4 of the drawing, I have indicated by the numeral 5 a diffusing screen similar to that shown in Fig. 3, and the reference characters 3 represent the screened or diffused areas; but, in this construction, the film or negative 6 is disposed in a spaced relation to the screen 5 in order to provide a greater degree of diffusion of the light in the operation of making an enlargement, the air space or gap between the negative and the screen producing this result.

The same result accomplished with the structure shown in Fig. 4 may be accomplished by using a thicker mask 5 as in Fig. 6, in which latter figure, the film or negative 6 is disposed directly upon one surface of the mask 5 and a supporting glass or transparent body is arranged on the other surface of the negative as in Fig. 3.

I may also use as a base for the diffusing screen a ground glass or a film having a ground or frosty surface or a portion of the surface ground or frosted or any other material may be employed having similar characteristics. In this type of a mask, the normally translucent areas may be rendered transparent by the use of balsam fir, turpentine, varnishes, oils, and many other materials. With masks prepared or treated in this manner, I may use the same directly above the sensitized surface upon which the enlargement is to be made instead of in close proximity to the negative. It is preferred that the screen be made larger than the sensitized surface in order to cover safely all of said surface, and at the same time, permit manual or mechanical movement or vibration of the mask while the projected enlargement is made in order to soften the contour lines of the screen and to avoid a sharp reproduction.

In Fig. 5 of the drawing, I have shown a mask wherein the shaded areas 9, as represented in the drawing, indicate the parts of a ground glass, frosted or similar screen, which have been treated with balsam fir and other materials to render them transparent. The shaded areas are not in this respect to be regarded as translucent, but merely, to indicate the areas to which the balsam fir or other materials are applied to produce the desired transparency. In other words, in Fig. 5, the areas which are plain and unshaded are, in fact, ground or frosted surfaces. It will thus readily be seen that these surfaces produce the desired diffusing in the resulting enlargement.

I do not wish to be limited to the exact details herein shown and described, as the invention includes many modifications and adaptations which are amplified in the appended claims.

Having fully described my invention, what I claim as new and desire to secure by Letters Patent, is:

1. A diffusing element for diffusing predetermined sections of a photographic negative of the portrait type, said element being transparent and arranged in close proximity to the image bearing side of the negative and having translucent diffusing markings in the form of a facial mask arranged thereon in registering alinement with the facial areas or sections only of the portrait subject of the negative to be diffused.

2. A diffusing element for diffusing predetermined sections or areas of a photographic portrait negative in making a print thereof, said element being transparent and arranged in close proximity to the image bearing side of the negative and having translucent diffusing material thereon forming screen sections or areas in the form of a facial mask, and said facial mask registering with the forehead, cheeks, nose, chin, neck and other facial sections of the portrait of said negative for diffusing the same in the production of a print.

3. The combination with a portrait photographic negative, of means arranged in juxtaposition to and paralleling the image bearing side of the negative for diffusing the facial areas thereof such as the forehead, cheeks, nose, chin, neck and the like in the operation of projecting the portrait image of the negative onto a sensitized surface, said means comprising a plate or film having transparent properties, and translucent screen markings in the form of a facial mask arranged in registering alinement with said facial areas of the portrait image of said negative.

4. The herein described method of reproducing a portrait image of a photographic negative onto a sensitized surface, which consists in applying diffusing markings in the form of a facial mask upon a transparent plate or film element, then arranging said element at the image bearing side of the negative and in registering alinement with the facial areas of the portrait image of the negative, and then projecting a light through said negative and element to produce on said sensitized surface a reproduction of said portrait image diffused as to predetermined facial areas by the mask of said element.

ALEXANDER BALABAN.